2,868,783

11 - OXYGENATED - 17α,21 - DIHYDROXY - 4-PREGNEN-20-ONES AND THE 21-ESTERS THEREOF

Arthur R. Hanze, Kalamazoo, Mich., assignor to The Upjohn Company, Kalamazoo, Mich., a corporation of Michigan No Drawing. Application April 14, 1958
Serial No. 728,074

10 Claims. (Cl. 260—239.55)

This invention relates to a new class of steroid compounds and is more particularly concerned with 3-deoxycortisone, 3-deoxyhydrocortisone, and the 21-esters thereof, intermediates in the production thereof, and a process for the production thereof.

In this application the terms 3-deoxycortisone and 3-deoxyhydrocortisone are used for the sake of convenience to designate 17α,21-dihydroxy-4-pregnene-11,20-dione and 11β,17α,21-trihydroxy-4-pregnen-20-one, respectively.

The new compounds and the process of the present invention are illustratively represented by the following formulae:

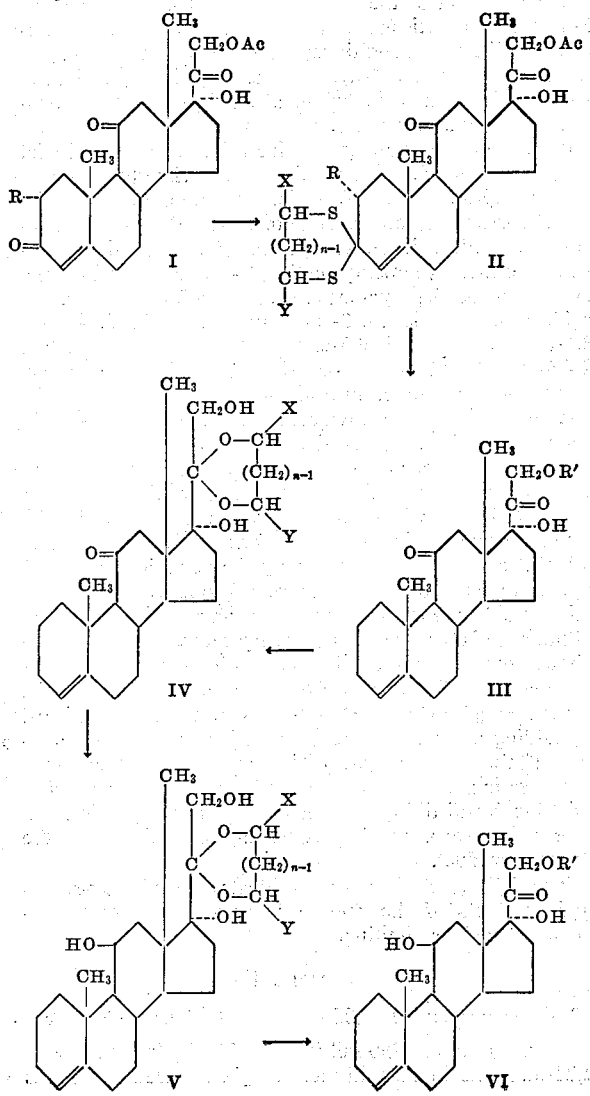

wherein R is hydrogen or an α-acetoxy radical, Ac is an acetyl radical, R' is hydrogen or the acyl radical of a hydrocarbon carboxylic acid containing from one to twelve carbon atoms, inclusive, X and Y are hydrogen, methyl or ethyl, and $n$ is a whole number from one to three, inclusive.

Compounds III and VI above, 3-deoxycortisone, 3-deoxyhydrocortisone, and the 21-esters thereof, possess hypotensive properties and are effective in regulating the central nervous system. The compounds in the ester or the free 21-alcohol form can be administered in conventional dosage forms such as pills, tablets, capsules, syrups or elixers for oral use, or in liquid forms which are adaptable to the natural and synthetic cortical steroid hormones for injectable products. Compound II, above, possesses modified adrenocortical activity.

The starting materials for the process of the present invention are cortisone 21-acetate and 2α-hydroxycortisone 2,21-diacetate. Starting with 2α-hydroxycortisone 2,21-diacetate, for example, the process of the present invention comprises: treating the said 2α-hydroxycortisone 2,21-diactate with an alkane dithiol in accordance with the procedure described in J. Am. Chem. Soc., 76, 1945 (1954) to produce the corresponding 3-alkylene thioketal of 2α-hydroxycortisone 2,21-diacetate; treating the thus obtained 3-alkylene thioketal with a desulfurizing agent such as Raney nickel, for example by dissolving the thioketal in an organic solvent inert to the reaction and passing the solution over the Raney nickel, preferably disposed on a carrier such as diatomaceous earth or synthetic magnesium silicate, to obtain 17α,21-dihydroxy-4-pregnene-11,20-dione 21-acetate (III); hydrolyzing the thus obtained 21-acetate (III) with an alkali metal bicarbonate to obtain 17α,21-dihydroxy-4-pregnene-11,20-dione (3-deoxycortisone) treating the latter compound with a ketalizing agent, for example alkanediols such as ethylene glycol or propylene glycol, to obtain 17α,21-dihydroxy-4-pregnene-11,20-dione 20-alkylene ketal; treating the thus obtained ketal with a reducing agent such as lithium aluminum hydride or sodium borohydride to obtain 11β,17α,21-trihydroxy-4-pregnen-20-one 20-alkylene ketal; hydrolyzing the latter compound with a mineral acid to obtain 11β,17α,21-trihydroxy-4-pregnen-20-one (3-deoxyhydrocortisone), and treating the thus obtained 11β,17α,21-trihydroxy-4-pregnen-20-one with an acylating agent to obtain 11β,17α,21-trihydroxy-4-pregnen-20-one 21-acylate wherein the acyl group is that of a hydrocarbon carboxylic acid containing from one to twelve carbon atoms, inclusive. Treating 3-deoxycortisone (III, above) with an acylating agent, e. g., the acid halide or anhydride of a hydrocarbon carboxylic acid containing from one to twelve carbon atoms, inclusive, is productive of the corresponding 3-deoxycortisone 21-acylate. Alternatively, starting with cortisone 21-acetate, the said cortisone 21-acetate is treated with an alkane dithiol, as given above, to obtain the 3-alkylene thioketal of cortisone 21-acetate (II); then the thus obtained thioketal is treated with Raney nickel to give 17α,21-dihydroxy-4-pregnene-11,20-dione 21-acetate (III), identical with that obtained from 2α-hydroxycortisone 2,21-diacetate.

Suitable alkanedithiols for the preparation of Compound I are ethanedithiol, propane-1,2-dithiol, butane-2,3-dithiol, propane-1,3-dithiol and the like wherein the two sulfur atoms are connected by means of a carbon chain of from two to four carbon atoms, which can contain additional methyl or ethyl branching groups. The thioketalization reaction is carried out in an acidic reaction medium such as glacial acetic acid. A condensing agent such as a boron trifluoride compound, e. g., boron trifluoride, hydrogen fluoride, or an alcohol or ether complex of boron trifluoride is employed and the reaction time can be from a few minutes to several hours, conveniently at room temperature. The product is recovered from the reaction mixture by adding water and extracting the mixture with an organic solvent such as methylene chloride, ether, and the like. The 3-thioketal can be purified by conventional methods such as recrystallization and can be utilized in the crude or purified form for the preparation of Compound III, 17α,21-dihydroxy-4-pregnene-11,20-dione 21-acetate (3-deoxycortisone 21-acetate).

Suitable solvents for the desulfurization of Compound II are dioxane, diethyl ether, dibutyl ether, ethanol, methanol, propanol, benzene, toluene, tetrahydrofuran, and the like. The solution can be passed over a bed of Raney nickel, preferably in the form of a column, and preferably disposed on a carrier such as diatomaceous earth or synthetic magnesium silicate, and the 3-deoxycortisone 21-acylate recovered from the eluate by means of chromatography, fractional crystallization, and the like. Alternatively, the desulfurization can be carried out by stirring a solution of Compound II with Raney nickel for several hours at from room temperature to the boiling point of the reaction mixture.

Hydrolysis of 3-deoxycortisone 21-acetate to obtain 3-deoxycortisone is carried out under conventional conditions for the hydrolysis of cortisone or hydrocortisone 21-acetate, for example with sodium or potassium bicarbonate in aqueous methanol, ethanol, or the like, and with exclusion of oxygen.

3-deoxyhydrocortisone is obtained from 3-deoxycortisone by reduction of the 11-keto group with for example, sodium or potassium borohydride, lithium aluminum hydride, and the like, following protection of the 20-keto group by, for example, ketalization. Suitable ketalizing agents are alkanediols selected from the groups consisting of vicinal alkanediols, alkane-1,3-diols, or alkane-1,4-diols containing from two to eight carbon atoms, inclusive. In carrying out the ketalization process 3-deoxycortisone is admixed with at least the theoretical amount of alkanediol in an organic solvent which is non-reactive with the steroid under the reaction conditions, for example benzene, toluene, xylene, methylene chloride, petroleum ether, and the like. Usually between about five and about fifty moles of alkanediol are used per mole of the starting steroid. A reaction temperature between about twenty and about 200 degrees centigrade is operative. Usually the reaction is conducted at the reflux temperature of the mixture, and water is removed by co-distillation with the solvent. A catalyst such as a mineral acid or a benzenesulfonic acid, for example sulfuric acid, hydrochloric acid, meta- and para-toluene sulfonic acids, or the like is employed. The product, 3-deoxycortisone 20-alkylene ketal (IV) is isolated by conventional means such as washing the reaction mixture with water to remove the catalyst and excess alkanediol, evaporating the solvent to dryness, and recrystallizing the crude ketal from suitable organic solvents such as acetone, ethyl acetate, methanol, ethanol, and the like.

To obtain 3-deoxyhydrocortisone 20-alkylene ketal (V), 3-deoxycortisone 20-alkylene ketal (IV) is treated with a reducing agent such as lithium aluminum hydride, lithium borohydride, sodium borohydride, hydrogen in the presence of a catalyst such as Raney nickel or platinum, or the like, with lithium aluminum hydride and sodium borohydride being preferred, in a solvent such as, for example, ether, benzene, tetrahydrofuran, dioxane, and others which are non-reactive under the conditions of the reaction. In the preferred embodiment of the process, when lithium aluminum hydride is used, it is admixed with a suitable organic solvent, such as ether, the steroid is dissolved in a non-reactive solvent such as, for example, ether, benzene, or tetrahydrofuran, and the admixtures then combined to form the reaction mixture. The reaction is carried out for a time varying from one half to about eight hours, at a temperature between about room temperature and the reflux temperature of the reaction mixture. The ratio of reducing agent to starting steroid may be varied over a wide range, a substantial excess of reducing agent generally being employed with mole ratios of up to fifty to one and above being operative. After completion of the reaction the reaction mixture is cautiously treated with water to decompose the excess metal hydrides. The organic layer is separated from the water layer and the solvent is evaporated to yield crude 3-deoxyhydrocortisone 20-alkylene ketal, which can be purified by conventional means such as crystallization from acetone or alcohol. When sodium borohydride is used, the solvent is preferably an aqueous alkanol, e. g., methanol, ethanol, isopropanol, and the like.

To obtain 3-deoxyhydrocortisone (VI), 3-deoxyhydrocortisone 20-alkylene ketal is dissolved in an organic solvent such as methanol, ethanol, dioxane, acetone and the like and this solution is admixed with a hydrolyzing agent. Usually an excess of a dilute aqueous solution of a mineral acid such as sulfuric acid, hydrochloric acid, and the like is used as the hydrolyzing agent, with a five to tenfold excess being preferred. Usually the reaction mixture is stirred for a period of ten minutes to one hour at the temperature of reflux or for about 24 hours at room temperature. The thus obtained 3-deoxyhydrocortisone is obtained from the reaction mixture by conventional means, such as removal of the solvent by evaporation, extraction and recrystallization.

Esterification of the 3-deoxyhydrocortisone to produce 3-deoxyhydrocortisone 21-acylate can be performed under esterification conditions known in the art, e. g., by the reaction of the 21-hydroxy steroid with an acylating agent such as an acid anhydride, acid chloride or bromide of a hydrocarbon carboxylic acid containing from one to twelve carbon atoms, inclusive, e. g., propionic, butyric, isobutyric, valeric, isovaleric, trimethylacetic 2-methylbutyric, 3 - ethylbutyric, hexanoic, diethylacetic, triethylacetic, heptanoic, octanoic, α-ethylisovaleric, succinic, a cyclic acid, e. g., cyclopropylideneacetic, cyclopentylformic, cyclopentylacetic, β - cyclohexylpropionic, cyclohexylformic, cyclohexylacetic, an aryl or alkaryl acid, e. g., benzoic, 2-, 3- or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, an unsaturated acid, e. g., acrylic, maleic, vinyl acetate, propionic, undecolic, and the like acids. The formate can be made by reacting the 21-hydroxy steroid with formic acid. Solvents which are frequently employed in the acylating process include acetic acid, pyridine, benzene, toluene, and the like. Preferably the acylation is carried out at about room temperature or somewhat above to minimize decomposition of the starting steroid or product, although higher and lower temperatures, e. g., from about zero degrees centigrade to the boiling point of the reaction mixture can also be used. Isolation of the 3-deoxyhydrocortisone 21-acylate is conveniently achieved by adding a large volume of water to the reaction mixture if the reaction solvent is water miscible and thus precipitating the product, or if the solvent is water immiscible by distilling the solvent from the reaction mixture to leave a residue consisting essentially of the desired product.

The following examples are illustrative of the process and products of the present invention but are not to be construed as limiting.

EXAMPLE 1

2α-hydroxycortisone 2,21-diacetate 3-ethylene thioketal

To a solution of 790 milligrams of 2α-hydroxycortisone 2,21-diacetate in 22 milliliters of glacial acetic acid was added two milliliters of ethanedithiol and twenty milliliters of boron trifluoride etherate, at room temperature. After ten minutes the reaction mixture was poured into 200 milliliters of ice water and the resulting mixture was extracted three times with methylene chloride. The methylene chloride solutions were combined and washed once with water, twice with saturated aqueous sodium bicarbonate and twice with water. The methylene chloride solution was then dried over sodium sulfate, filtered and the solvent was removed by evaporation, leaving a crystalline solid which was recrystallized from a mixture of acetone and Skellysolve B hexanes to give 560 milligrams of crystals having a melting point of 240 to 243.5 degrees centigrade. This product was recrystallized from acetone giving 370 milligrams of 2α-hydroxycortisone 2,21-diacetate 3-ethylene thioketal having a melting point of 246 to 248.5 degrees centigrade, and the following analysis:

Analysis.—Calculated for $C_{27}H_{36}O_7S$: C, 60.51; H, 6.77; S, 10.97. Found: C, 60.72; H, 7.00; S, 11.77.

In the same manner as given above, other 2α-hydroxycortisone 2,21-diacetate 3-alkylene thioketals are prepared by reacting 2α-hydroxycortisone 2,21-diacetate with an alkanedithiol, preferably an alkanedithiol wherein the two sulfur atoms are connected by means of a carbon chain of from two to four carbon atoms, inclusive, which can contain additional methyl or ethyl branching groups, in the presence of a condensing agent such as boron trifluoride or boron trifluoride etherate. Illustratively, such other 2α-hydroxycortisone, 2,21-diacetate 3-alkylene thioketals include: 2α-hydroxycortisone 2,21-diacetate 3-(1,3-propane)-dithiol ketal, 2α-hydroxycortisone 2,21-diacetate 3-(2,3-butane)-dithioketal, 2α-hydroxycortisone 2,21-diacetate 3-(1,4-butane)-dithioketal, and the like.

EXAMPLE 2

Cortisone 21-acetate 3-ethylene thioketal

In the same manner as given in Example 1, treating cortisone 21-acetate with ethanedithiol in the presence of boron trifluoride etherate is productive of cortisone 21-acetate 3-ethylene thioketal.

In the same manner as given in Example 1, other cortisone 21-acetate 3-alkylene thioketals are prepared by reacting cortisone 21-acetate with an alkanedithiol, preferably an alkanedithiol wherein the two sulfur atoms are connected by means of a carbon chain of from two to four carbon atoms, inclusive, which can contain additional methyl or ethyl branching groups, in the presence of a condensing agent such as boron trifluoride or boron trifluoride etherate. Illustratively, such other cortisone 21-acetate 3-alkylene thioketals include: cortisone 21-acetate 3-(1,3-propane)-dithioketal, cortisone 21-acetate 3-(2,3-butylene)-thioketal, cortisone 21-acetate 3-(1,4-butane)-dithioketal, and the like.

EXAMPLE 3

17α,21-dihydroxy-4-pregnene-11,20-dione 21-acetate (3-deoxycortisone 21-acetate) (III)

A solution of 500 milligrams of 2α-hydroxycortisone 2,21-diacetate 3-ethylenethioketal in 100 milliliters of warm absolute ethanol was passed over a Raney nickel-diatomaceous earth (one part of Raney nickel to two parts of diatomaceous earth by weight) column three eighths of an inch in diameter by fifteen inches in length. The reaction mixture was drawn through the column by use of reduced pressure in the receiving vessel. After the reaction mixture had passed through, the column was washed with 300 milliliters of ethanol. The reaction solution and the ethanol wash were combined and concentrated to dryness under reduced pressure, leaving 298 milligrams of residue. The residue was dissolved in methylene chloride and chromatographed over 35 grams of synthetic magnesium silicate. The column was developed with seventy-milliliter portions of three percent acetone in methylene chloride, and the first three fractions were evaporated to dryness, combined (total weight 82 milligrams) and crystallized from a mixture of water and isopropyl alcohol to give 35 milligrams of 17α,21-dihydroxy-4-pregnene-11,20-dione 21-acetate having a melting point of 203 to 207 degrees centigrade. After recrystallization from a mixture of acetone and Skellysolve B hexanes there was obtained 25 milligrams of 17α,21-dihydroxy-4-pregnene-11,20-dione 21-acetate having a melting point of 205 to 209 degrees centigrade, and the following analysis:

Analysis.—Calculated for $C_{23}H_{32}O_5$: C, 71.00; H, 8.43. Found: C, 70.95; H, 8.43.

Alternatively, the desulfurization and hydrogenolysis of 2α-hydroxycortisone 21-acetate 3-ethylene thioketal can be effected by batchwise heating of the steroid in alcohol solution with Raney nickel for three to four hours. The product, 3-deoxycortisone 21-acetate, can be isolated as described above by chromatography and crystallization.

In the same manner as given in Example 3, treating other 2α-hydroxy cortisone 2,21-diacetate 3-thioketals, e. g. 2α-hydroxycortisone 2,21-diacetate 3-(2,3-butane)-dithioketal, 2α-hydroxycortisone 2,21-diacetate 3-(1,3-propane)-dithiol ketal, 2α-hydroxycortisone-2,21-diacetate 3-(1,4-butane)-dithioketal and the like with Raney nickel is productive of 3-deoxycortisone 21-acetate.

In the same manner as given in Example 3, treating cortisone 21-acetate 3-ethylene thioketal, cortisone 21-acetate 3-(1,3-propane)-dithioketal, cortisone 21-acetate 3-(1,4-butane)-dithioketal and the like with Raney nickel is productive of 3-deoxycortisone 21-acetate.

EXAMPLE 4

3-deoxycortisone

One gram of 3-deoxycortisone 21-acetate is dissolved in 100 milliliters of methanol, previously purged of air-oxygen by passing nitrogen through it for ten minutes, and thereto is added 0.5 gram of potassium bicarbonate in fifty milliliters of water similarly purged of oxygen. The mixture is allowed to stand at room temperature in a nitrogen atmosphere for five to eight hours, thereupon neutralized with 0.66 milliliter of acetic acid in 15 milliliters of water, and concentrated at reduced pressure and below sixty degrees centigrade until precipitation of 3-deoxycortisone begins. Thereupon fifty milliliters of water is added and the mixture is chilled. The precipitate of crude 3-deoxycortisone is separated by filtration, washed with water, dried and purified by recrystallization from acetone.

EXAMPLE 5

3-deoxycortisone 20-ethylene ketal

In the same manner as given by Antonucci, Bernstein, et al., J. Org. Chem. 18, 70 (1953), for the preparation of cortisone 3,20-bis-(ethylene ketal), treating 3-deoxycortisone with ethylene glycol in the presence of paratoluenesulfonic acid is productive of 3-deoxycortisone 20-ethylene ketal.

Similarly, other 3-deoxycortisone 20-alkylene ketals are obtained in the same manner as given above by treating 3-deoxycortisone in the presence of an acid catalyst, e. g., paratoluenesulfonic acid, with alkanediols containing from two to eight carbon atoms, inclusive, in which the hydroxyl groups are attached to a carbon chain of from two to four carbon atoms, inclusive, which may contain additional methyl or ethyl branching groups, e. g., propane-1,2-diol, propane-1,3-diol, butane-1,2-diol, butane-1,3-diol, butane-1,4-diol, pentane-1,2-diol, pentane-1,3-diol, pentane-1,4-diol, hexane-2,4-diol, and the like.

EXAMPLE 6

3-deoxyhydrocortisone 20-ethylene ketal

In the same manner as given by Antonucci, Bernstein, et al., J. Org. Chem. 18, 70 (1953), for the preparation of hydrocortisone 20-ethylene ketal, treating 3-deoxycortisone 20-ethylene ketal with lithium aluminum hydride is productive of 3-deoxyhydrocortisone 20-ethylene ketal.

Similarly, treating other 3-deoxycortisone 3-alkylene ketals, from Example 5, with lithium aluminum hydride is productive of the corresponding 3-deoxyhydrocortisone 3-alkylene ketals.

EXAMPLE 7
*3-deoxyhydrocortisone*

In the same manner as given by Antonucci, Bernstein et al., J. Org. Chem. 18, 70 (1953), for the production of hydrocortisone, treating 3-deoxyhydrocortisone 3-ethylene ketal with dilute sulfuric acid is productive of 3-deoxyhydrocortisone.

Similarly, treating other 3-deoxyhydrocortisone 3-alkylene ketals, from Example 6, with a dilute mineral acid is productive of 3-deoxyhydrocortisone.

EXAMPLE 8
*3-deoxyhydrocortisone 21-acetate*

A mixture is prepared containing one gram of 3-deoxyhydrocortisone in five milliliters of pyridine and five milliliters of acetic anhydride. The mixture is maintained at room temperature for a period of six hours, thereupon poured into 100 milliliters of ice-water and the resulting aqueous mixture extracted with three 25-milliliter portions of methylene chloride. The combined methylene chloride solutions are washed, dried over sodium sulfate and evaporated to give crude 3-deoxyhydrocortisone 21-acetate, which is purified by recrystallization from acetone.

EXAMPLE 9
*3-deoxyhydrocortisone 21-acylate*

In the same manner as given in Example 8 above, treating 3-deoxyhydrocortisone in pyridine solution with an acyl halide or anhydride, wherein the acyl group is that of a hydrocarbon carboxylic acid containing from one to twelve carbon atoms, inclusive, is productive of the corresponding 21-acylate, e. g., the propionate, butyrate, isobutyrate, valerate, isovalerate, trimethylacetate, 2-methylbutyrate, 3-ethylbutyrate, hexanoate, diethylacetate, triethylacetate, heptanoate octanoate, α-ethylisovalerate, succinate, cyclopropylideneacetate, cyclopentylformate, cyclopentylacetate, β-cyclohexylpropionate, cyclohexylformate, cyclohexylacetate, benzoate, 2, 3, or 4-methylbenzoate, 2,3-, 2,4-, 2,5-, 2,6-, 3,4- and 3,5-dimethylbenzoate, ethylbenzoate, 2,4,6-trimethylbenzoate, 2,4,6-triethylbenzoate, α-naphthoate, 3-methyl-α-naphthoate, phenylacetate, phenylpropionate, diphenylacetate, triphenylacetate, acrylate, maleate, vinylacetate, propiolate, undecolate, and the like. The formate can be made by treating 3-deoxyhydrocortisone with formic acid.

EXAMPLE 10
*3-deoxycortisone 21-acylate*

In the same manner as given in Example 9, treating 3-deoxycortisone in pyridine solution with an acyl halide or anhydride, wherein the acyl group is that of a hydrocarbon carboxylic acid containing from one to twelve carbon atoms, inclusive, is productive of the corresponding 3-deoxycortisone 21-acylate.

It is to be understood that the invention is not to be limited to the exact details of operation or exact compounds shown and described, as obvious modificaions and equivalents will be apparent to one skilled in the art and the invention is therefore to be limited only by the scope of the appended claims.

I claim:

1. 11 - oxygenated - 17α,21 - dihydroxy - 4 - pregnen-20-one and the 21-acylates thereof, wherein the 11-oxygen substituent is selected from the group consisting of keto and β-hydroxy, and the acyl group is that of a hydrocarbon carboxylic acid containing from one to twelve carbon atoms, inclusive.

2. 17α,21 - dihydroxy - 4 - pregnene - 11,20 - dione and the 21-acylates thereof, wherein the acyl group is that of a hydrocarbon carboxylic acid containing from one to twelve carbon atoms, inclusive.

3. 17α,21-dihydroxy-4-pregnene-11,20-dione.

4. 17α,21-dihydroxy-4-pregnene-11,20-dione 21-acetate.

5. 11β,17α,21-trihydroxy-4-pregnen-20-one and the 21-acylates thereof wherein the acyl group is that of a hydrocarbon carboxylic acid containing from one to twelve carbon atoms, inclusive.

6. 11β,17α,21-trihydroxy-4-pregnen-20-one.

7. 11β,17α,21-trihydroxy-4-pregnen-20-one 21-acetate.

8. 11 - oxygenated - 17α,21 - dihydroxy - 4 - pregnen-20-one 20-alkylene ketal of the formula:

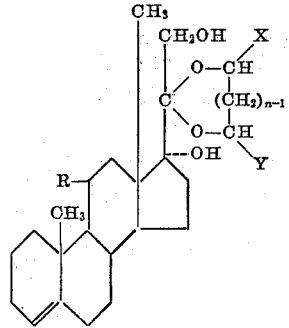

wherein R is selected from the group consisting of keto and β-hydroxy, X and Y are selected from the group consisting of hydrogen, methyl, and ethyl groups, and n is a whole number from one to three, inclusive.

9. 17α,21 - dihydroxy - 4 - pregnene - 11,20 - dione 20-ethylene ketal.

10. 11β,17α,21 - trihydroxy - 4 - pregnen - 20 - one 20-ethylene ketal.

References Cited in the file of this patent
UNITED STATES PATENTS

| | | |
|---|---|---|
| 2,707,184 | Hogg et al. | Apr. 26, 1955 |
| 2,744,108 | Ralls | May 1, 1956 |
| 2,759,930 | Sondheimer et al. | Aug. 21, 1956 |
| 2,775,602 | Babcock et al. | Dec. 25, 1956 |

OTHER REFERENCES

Djerassi et al.: J. A. C. S., 76, page 5534 (1954).

UNITED STATES PATENT OFFICE
CERTIFICATE OF CORRECTION

Patent No. 2,868,783                                                            January 13, 1959

Arthur R. Hanze

It is hereby certified that error appears in the printed specification of the above numbered patent requiring correction and that the said Letters Patent should read as corrected below.

Column 4, line 49, for "vinyl acetate" read -- vinyl acetic --; same column, lines 49 and 50, for "propionic" read -- propiolic --.

Signed and sealed this 14th day of July 1959.

(SEAL)

Attest:

KARL H. AXLINE
Attesting Officer

ROBERT C. WATSON
Commissioner of Patents